US012240234B2

(12) United States Patent
Clement

(10) Patent No.: US 12,240,234 B2
(45) Date of Patent: Mar. 4, 2025

(54) METHOD FOR PRINTING ON A DÉCOR PAPER AND/OR ON A DÉCOR FOIL

(71) Applicant: Unilin, BV, Wielsbeke (BE)

(72) Inventor: Benjamin Clement, Waregem (BE)

(73) Assignee: Unilin, BV, Wielsbeke (BE)

( * ) Notice: Subject to any disclaimer, the term of this patent is extended or adjusted under 35 U.S.C. 154(b) by 119 days.

(21) Appl. No.: 18/061,742

(22) Filed: Dec. 5, 2022

(65) Prior Publication Data

US 2023/0173806 A1 Jun. 8, 2023

(30) Foreign Application Priority Data

Dec. 7, 2021 (EP) .................................... 21212840

(51) Int. Cl.
*B41J 2/045* (2006.01)
*B41J 3/28* (2006.01)

(52) U.S. Cl.
CPC ....... *B41J 2/04573* (2013.01); *B41J 2/04581* (2013.01); *B41J 3/28* (2013.01)

(58) Field of Classification Search
CPC ....... B41J 2/04573; B41J 2/04581; B41J 3/28
See application file for complete search history.

(56) References Cited

U.S. PATENT DOCUMENTS 10,792,935 B2 * 10/2020 Thomas .................. B31F 1/285
2007/0057983 A1 * 3/2007 Kawaguchi .......... B41J 2/16526 347/9
2011/0069101 A1 * 3/2011 Buschmann ........... B41J 2/2128 347/14
2020/0070544 A1 * 3/2020 Ohnishi ................. B41J 2/2103
2020/0207082 A1 7/2020 Kurashima et al.
2021/0031547 A1 * 2/2021 Kato .................... B41J 2/16532
2021/0187991 A1 6/2021 Lenaerts et al.

FOREIGN PATENT DOCUMENTS

EP 1114722 A1 7/2001
JP 2004-299341 A 10/2004

* cited by examiner

*Primary Examiner* — Jason S Uhlenhake
(74) *Attorney, Agent, or Firm* — Capitol City TechLaw

(57) ABSTRACT

A method is provided for printing onto a décor paper and/or foil that may be suitable for being used in decorative panels. The method may involve providing a printable substrate. A pattern may be printed on the printable substrate by ejecting droplets of ink by means of at least one inkjet printing head that may include one or more nozzles. After a first predetermined time period, the printing operation may be interrupted for a second predetermined time period and/or a controlling frequency of the printhead may be changed for a second predetermined time period.

17 Claims, 4 Drawing Sheets

METHOD FOR PRINTING ON A DÉCOR PAPER AND/OR ON A DÉCOR FOIL

This application claims priority under 35 USC 119(a)-(d) from EP patent application No. 21212840.9 filed on Dec. 7, 2021, the entire contents of which are incorporated herein by reference.

BACKGROUND

1. Field

The present invention relates to a method for printing on a décor paper and/or a décor foil. Said décor paper or décor foil can be used as decorative layer in decorative panels, for example floor, wall, ceiling or furniture panels.

2. Discussion of Related Art

Décor paper and/or foil for decorative panels are usually printed using analogue gravure printing. A known drawback of analog printing is that shifting from one design to another is expensive and time consuming since it is necessary to engrave new cylinders and formulate the inks. On the other hand, the main advantage of analogue printing is the high productivity due to the high printing speed.

Digital inkjet printing normally provides for a higher flexibility of the printing process and simplifies the operation of shifting from one décor to another one. On the other hand, inkjet printing is a slower and less productive process when compared to analogue printing. Moreover, during private research, the inventor has found that during long lasting digital inkjet printing sessions, it is possible to notice a reduction of quality in the inkjet printed decors. Such loss of quality is not noticeable or less evident in analogue printing.

SUMMARY

The present invention aims in the first place to provide an alternative ink set for, which, in accordance with several of its preferred embodiments, is directed to solve one or more of the problems arising in the state of the art.

Thereto, the present invention, according to its first independent aspect, a method for printing onto a décor paper and/or foil, said décor paper or décor foil being suitable for being used in decorative panels, said method comprising the steps of providing a printable substrate and the step of printing a pattern on said printable substrate, wherein said pattern is printed by ejecting droplets of ink by means of at least one inkjet printing head provided with a plurality of jetting nozzles, wherein said head comprises one or more nozzles. The method of the first independent aspect has the characteristic that after a first predetermined time period the jetting of the ink by the printhead and/or by the jetting nozzles is interrupted for a second predetermined time period and/or a controlling frequency of the printhead and/or of the nozzles is changed for a second predetermined time period.

The inventor has noticed that during said substantially uninterrupted printing operation the printheads, and in particular the nozzles thereof, are subjected to a prolonged solicitation. In particular, said prolonged solicitation is in form of an alternate expansion and contraction of a piezoelectric component of the print head and in particular of each nozzle. Said alternate expansion and contraction occurs according to a predetermined control frequency. The prolonged solicitation can cause the formation of resonance phenomena and/or the undesired variation of printing parameters like, for example, droplet size and/or droplet speed or ink satellites. As a consequence, printing defects can be printed in the decorative pattern. Said first time period can be of at least for example at least 1 min. During private research the inventor has found that after said period residual vibrations can be generated at a sufficient extent to cause minor defects. In some embodiment of the invention the length of the first time period can be determined as a function of the quantity of ink to be jetted by the nozzles.

Thanks to the solution according to the above mentioned first independent aspect it may be possible to relax the solicitation on the nozzles in order to eliminate residual vibrations and thereby improving the reliability of the printheads.

According to a first preferred embodiment of the invention, during said second predetermined period the jetting of the ink is interrupted to cause a complete relaxing of the nozzles itself. In this way it may be possible to minimize the second predetermined time period so that the impact of the non-printing period on the productivity of the method can be reduced.

According to a second preferred embodiment of the invention, during said second predetermined period, said controlling frequency of the printhead is modified in order to allow said relaxing effect. In this case the controlling frequency can be preferably reduced, for example said controlling frequency can be reduced below a threshold value below which said residual vibration are minimized. For example, said threshold value can be lower than ½ of the starting controlling frequency, more preferably lower than ⅓ of the starting controlling frequency, even more preferably lower than ⅕ of said starting controlling frequency. According to said second preferred embodiment, during said second predetermined time period the jetting of the ink is not interrupted but continues, in this way it may be possible to improve the printing reliability without interrupting the printing process and therefore without affecting the productivity. Reducing the frequency, instead of interrupting the jet of the ink for a certain period can reduce the risk of drying of the ink into the printing head which could clog the nozzles thereby generating other printing defects.

In both the first and the second preferred embodiment, during said second predetermined time period the jetting interruption and/or the controlling frequency change can be applied to one or more of the nozzles. In some embodiments, said jetting interruption and/or the controlling frequency change can be applied contemporarily to only one nozzle or to a group of nozzles of the printhead, so that during the second predetermined time period of said nozzle or group, the remaining nozzles of the printhead continues printing. For example, in some embodiments at least a first group of nozzles and a second group of nozzles can be identified, wherein for each group of nozzles a respective second predetermined time period is identified and wherein said second predetermined time period of the groups are not overlapping or only partially overlapping. In this way it may be possible to hide, on the printed substrate, the effect caused by non-printing nozzles or low frequency printing nozzles of a group via the second group of nozzles. Said effect can be, for example, non-printed lines or areas. In this way it may be possible to improve the printing reliability without interrupting the printing process and keeping an acceptable printing quality.

According to a preferred solution during said second predetermined time period the jetting interruption and/or the controlling frequency change can be applied to all the nozzles at the same time, in this way it is possible to improve the printing reliability with the aim of keeping the highest possible printing quality.

In a special embodiment, during said second predetermined time period a technical area can be formed on the printable substrate. The technical area can comprise a test pattern or technical pattern, for example a pattern configured to highlight print defects on the printed substrate, like for example a color chart. In this special embodiment, the method can comprise the steps of evaluating the presence of defects in said technical area, analyze the result of said evaluation and determine the length of said second time period, for example the end of said second time period, on the basis of said analysis. Said evaluation can be performed with optical sensors, for example a digital scanner, and said analysis can be performed by a control unit, for example a personal computer. In this way it may be possible to stop the second time period, and for example start a subsequent time period, only when the printing quality is considered to be sufficient. The printing quality can be determined on the basis of one or more quality parameter determined in said evaluation step and/or one or more quality index that is function of said quality parameter. For example, said second time period can be interrupted when the quality index is higher or lower than a predetermined threshold value.

In some embodiments of the invention said technical area can be an unprinted area.

Preferably said technical area can show a length along a printing direction, for example a longitudinal direction of the said printable substrate, that can be lower than 10 mm Preferably, during use of the decorative paper or foil for manufacturing the decorative panel, the technical area is cut off and discarded. By keeping the length of the technical area below 10 mm it is possible to minimize the impact of the method of the invention on cost of the process.

During said first predetermined time period one or more decorative patterns can be printed on the printable substrate. Multiple decorative patterns can be printed on the printable substrate in a sequential manner and/or in substantially continuous way during said first predetermined time period. In some embodiments, it is possible that one decorative pattern is printed multiple times in in a sequential manner and/or in substantially continuous way during said first predetermined time period. According to the preferred embodiment of the invention, if at the end of said first predetermined time period the printing of the pattern is not completed, said second predetermined time period preferably starts after printing of the pattern is completed. In other words, preferably said second time period may start only after printing a discrete quantity of printed patterns.

After the end of said second predetermined time period the printing operation can start again with a new first predetermined time period. Preferably, said second predetermined time period can be at least 10 time shorter, more preferably at least 100 time shorter than the first time period. The inventor has found that said time can be sufficient to relax the residual vibration and improve the printing quality for the next printing session, for example for a next first time period.

In the most preferred embodiment, the method is part of a roll-to-roll process wherein the printable substrate is uncoiled from a first roll, printed upon, and coiled up again into a second roll. In alternative embodiments the method can be a part of a roll to sheet process wherein the printable substrate is uncoiled from a first roll, printed upon and cut to sheets.

In the most preferred embodiment, a relative movement between the printing substrate and the printing head is performed during the printing steps. For example, the printable substrate runs into an advancing direction below the printing heads that are preferably fixed in position. In this case the printing step according to the method is of the single pass type. It is noted that the method according to the first independent aspect is particularly advantageous in continuous printing processes like, for example, said above mentioned single pass process. In the preferred embodiment said relative movement is performed during said first timer period and during said second time period, for example said relative movement is continuous and without interruption during and between said first and second time period. In this way, the production rate of the manufacturing process is not affected by the invention, or the impact of the invention on the method is minimized. Alternatively, while jetting printed substrate can be stationary and the printheads can move above the printable substrate. In this case the printing step according to the method can be of the multipass type.

In the preferred embodiment, the printable substrate comprises a paper or a foil.

In case the printable substrate comprises a paper, it is preferable that said paper is an impregnatable paper for laminate panels, i.e. a paper that is suitable for being impregnated with a thermosetting resin. For example, the paper can have a base paper weight, i.e. higher than 20 grams per square meter, preferably between 50 to 100 grams per square meter, e.g. between 60 and 80 grams per square meter. Preferably, the paper is opaque and/or contains titanium oxide as a whitening agent and/or other inorganic fillers. Alternatively, the paper may be a colored, pigmented and/or dyed base paper. The paper layer can show a mean air resistance as expressed in Gurley value below 40 sec, preferably below 25 sec. Paper showings said mean air resistance are more prone to impregnation with resins.

In a special embodiment the printable substrate can comprise a paper sheet having a base paper weight, lower than 50 grams per square meter, preferably between 20 to 50 grams per square meter. The paper layer according to this special embodiment can show a mean air resistance as expressed in Gurley value below 15 sec. The paper layer according to this special embodiment can be used during a “dry press operation” during HPL, CPL or DPL lamination. With dry press it is meant that the printed paper is not impregnated, but it is sandwiched between two paper layers which contain resin and the bonding is performed during lamination.

In a special embodiment the printable substrate, can comprise a paper sheet having a base paper weight between 50-100 g/sqm. Preferably, the paper is opaque and/or contains titanium oxide as a whitening agent and/or other inorganic fillers. The paper layer according to this special embodiment can show a mean air resistance as expressed in Gurley value above 100 sec. Such paper is called a “pre-impregnate” paper and after printing a lacquer is applied on top of the print. This lacquered paper is then glued on a substrate.

In case said substrate comprises a foil, this is preferably made of a thermoplastic material. Said thermoplastic foil can be preferably made of polyvinylchloride (PVC) or polypropylene (PP). Other example of thermoplastic material for the foil are polyethylene (PE), polyethylene-terephthalate (PET) or thermoplastic polyurethane (TPU).

In the preferred embodiment, the printable substrate can comprise an ink receiver layer. Said ink receiver layer can comprise at least a binder and/or a pigment. The ink receiver layer can help reducing the quantity of the ink to be delivered onto the printable substrate. The inventor has found that the reduction of said quantity of ink, the nozzles of the printhead are less solicited so that the first period can be extended before it becomes necessary to intervene with the second period.

Said ink receiver layer can be provided on the paper or foil in a predetermined amount between 0.5 g/sqm and 5 g/sqm dry.

Preferably, said substrate is provided with 0.2 to 10 g/$m^2$, and preferably between 0.2 and 5 g/$m^2$ dry coating weight of pigment in said ink receiver layer. Preferably said pigment has a BET surface area between 10 and 1600 $m^2$/g, and preferably between 15 and 500 $m^2$/g.

According to the most preferred embodiment, for the pigment of said ink receiver layer at least or mainly silica particles are used.

According to variants, for the pigment of said ink receiver layer at least or mainly particles are used chosen from the list consisting of calcium carbonate, alumina, aluminosilicates, ordered mesoporous materials, modified silica, organosilica, modified organosilica, organoalumina, modified alumina, aluminates, modified aluminates, organoaluminates, modified organoaluminates, zeolites, metal organic frameworks and porous polar polymers.

According to some embodiments, the ink receiver layer can also be pigment free. The inventor has found that by limiting the quantity of pigment into the ink receiver layer it is possible to reduce the dust release effect during printing, wherein said dust could clog the nozzles of the printer thereby causing printing defects.

Preferably, said printable substrate is provided with 0.2 to 7 g/$m^2$, and preferably between 0.2 and 5 g/$m^2$, dry coating weight of a binder in said ink receiver layer. According to the most preferred embodiment, for the binder in said ink receiver layer at least or mainly polyvinyl alcohols are used.

According to variants, the ink receiver layer includes, as a binder, a polymer selected from the group consisting of hydroxyethyl cellulose; hydroxypropyl cellulose; hydroxyethylmethyl cellulose; hydroxypropyl methyl cellulose; hydroxybutylmethyl cellulose; methyl cellulose; sodium carboxymethyl cellulose; sodium carboxymethylhydroxethyl cellulose; water soluble ethylhydroxyethyl cellulose; cellulose sulfate; vinylalcohol copolymers; polyvinyl acetate; polyvinyl acetal; polyvinyl pyrrolidone; polyacrylamide; acrylamide/acrylic acid copolymer; polystyrene, styrene copolymers; acrylic or methacrylic polymers; styrene/acrylic copolymers; ethylene-vinylacetate copolymer; vinylmethyl ether/maleic acid copolymer; poly(2-acrylamido-2-methyl propane sulfonic acid); poly(diethylene triamine-co-adipic acid); polyvinyl pyridine; polyvinyl imidazole; polyethylene imine epichlorohydrin modified; polyethylene imine ethoxylated; ether bond-containing polymers such as polyethylene oxide (PEO), polypropylene oxide (PPO), polyethylene glycol (PEG) and polyvinyl ether (PVE); polyurethane; melamine resins; gelatin; carrageenan; dextran; gum arabic; casein; pectin; albumin; chitins; chitosans; starch; collagen derivatives; collodion and agar-agar. The most preferred variants for the binder are polyvinyl acetates, ethylvinylacetates, block copolymers based on polyvinylacetate, block copolymers based on polyvinylalcohol, acrylates, latexes, polyvinyl derivaties, VCVAC derivatives, polyurethanes based on polyols and isocyanates, polyurethanes based on polycarbamates and polyaldehydes, e.g. both as a watery dispersion/emulsion or a watery or solvent solution.

As stated above preferred binders for the ink receiving layer include polyvinyl alcohol (PVA), but according to variants a vinylalcohol copolymer or modified polyvinyl alcohol may be applied. The modified polyvinyl alcohol may be a cationic type polyvinyl alcohol, such as the cationic polyvinyl alcohol grades from Kuraray, such as POVAL C506, POVAL C118 from Nippon Goshei.

Preferably, said ink receiver layer has, globally seen, a pigment to binder ratio between 0/1 or 0.01/1 and 25/1, preferably between 0/1 or 0.01/1 and 20/1. It is not excluded that the ink receiver layer is non uniform and shows layerwise or areawise differences in composition, in which case the above values are average values for the totality of the inkjet receiver layer.

The ink receiver layer can further comprise a crosslinking agent. Preferably, the ink receiver layer can preferably comprise a content of crosslinking agent below 5% based on dry weight of the composition. The crosslinking agent can be preferably selected from the group comprising: aldehydes, polyaldehydes, dialdehydes, alcohols, boronic acid, borax, polyalcohols, carbamates, polycarbamates, carbonic acids, glyoxal based agent, zirconium-based agents, titanates and polycarbonic acids.

The ink receiver layer can further comprise a dispersant. A dispersant is an oligomer or polymer which stabilize the liquid dispersions of pigment contained in the ink against flocculation. The dispersant can comprise polycarboxylates, polyphosphates, a polyionic polymer, preferably polyDADMAC (Polydiallyldimethylammonium chloride) polyamine or alumina salts.

Preferably, the ink receiver layer is provided with less than 10%, more preferably less than 5% based on dry coating weight of dispersant, for example between 5 and 0%. Preferably, said ink receiver layer has, globally seen, a pigment to dispersant ratio between 10/1 and 100/1.

The ink receiver layer can also comprise a flocculant, preferably a metal salt, preferably a cationic metal salt. Preferably said metal salt is chosen from the list consisting of CaCl2, MgCl2, CaBr2, MgBr2, CMA (Calcium Magnesium Acetate), NH4Cl, Calcium Acetate, ZrCl4, calcium nitrate and Magnesium Acetate. The positive ion of the dissolved metal salt will tend to neutralize the electrosteric stabilization function of the pigment contained in the ink thereby improving its absorption. The most preferred cationic metal salts are CaCl2, MgCl2, CMA, Calcium Acetate, calcium nitrate and Magnesium Acetate, as the inventors have obtained the best results with these ink reactive compounds. Said flocculant can also be chosen from the list consisting of sodiumaluminate, a double sulphate salt such as alum, polyaluminumchloride, polyacrylate, dicyandiamide (e.g. Floquat DI5 from SNF) and polyacrylamide. The flocculating agent pulls the ink pigments out of the ink dispersion. Thereby the pigments are prevented from penetration to far down into the ink receiver layer. Mainly the vehicle of the ink, e.g. the water in the case of waterbased inks, is absorbed deeper down into the ink receiver layer.

Preferably, ink receiver layer is provided with 10 to 60%, based on dry coating weight of flocculating agent, in particular of metal salt.

The ink receiver layer may also comprise one or more of the following agents:

Agents altering, more particularly lowering, the pH of said ink receiver layer. Preferably the pH of the ink receiver layer composition is lowered to pH 6 or lower, by selecting the amount and type of said agent, which selection is within the ambit of the skilled man. Preferably said agent is chosen from the list consisting of formic acid, tartaric acid, acetic acid, hydrochloric acid, citric acid, phosphoric acid, sulfuric acid, AlCl3 and boronic acid. An adjusted, more particularly lowered pH, preferably to pH 6 or less, increases the chemical affinity of the inkjet receiver layer with the ink and will interfere with the electrosteric stabilization function on the pigment, such that the dispersion of the pigments in the ink will become destabilized quickly.

Particle surface modifying agents or coupling agents: between 0.05 and 5 $g/m^2$, preferably between 0.2 and 2 $g/m^2$, e.g. chosen from the non-limiting list consisting of amino silanes, ureido silanes, aldehyde silanes, tetraethylorthosilicate, siliazanes, organically modified silanes, organically modified siliazanes, chlorosilanes, organically modified chlorosilanes, bissilanes, organobissilanes, silsesquioxanes, polysilsesquioxnes, silane oligomers, organically modified silane oligomers, bissilane oligomers, organically modified bissilane oligomers, oligomeric silsesquioxanes, and oligomeric polysilsesquioxanes.

Additives: wetting agent between 0.005 and 1 $g/m^2$, preferably between 0.05 and 0.5 $g/m^2$; and/or defoaming agent between 0.005 and 1 $g/m^2$, preferably between 0.05 and 0.5 $g/m^2$; and/or fungicide between 0.005 and 1 $g/m^2$, preferably between 0.05 and 0.5 $g/m^2$.

Preferably said ink receiver layer is provided on the paper or foil before the printing operation, for example said ink receiver layer is provided in line with said printer. In some embodiments of the invention, the application of the ink receiver layer can be synchronized with said first and/or second timer period so that it is interrupted during said second time period and/or in such a way that during said second time period, in case the printable substrate continues running relative to the printhead, the portion of the printable substrate that runs below the printhead is free from said ink receiver layer. In this way it is possible to reduce production costs. Anyway, according to the preferred embodiment, the ink receiver layer is provided also during said second time period and so that to avoid possible defects in the ink receiver layer, that can be caused by interruption and restarting of the application thereof, to cause defects in the printed pattern.

Preferably the inks can be pigment containing inks. Pigmented inks have a higher lightfastness than dye containing inks, moreover thanks to the use of pigments it is possible to use a reduced quantity of ink to obtain the printed pattern. The inventor has found that by reducing the quantity of ink for forming the pattern it is possible to limit the solicitation on the printheads thereby reducing the risk of residual vibration formation. For example, the printing operation can comprise depositing on the printable substrate an average dry quantity of pigment below 5 g/sqm, more preferably below 3 g/sqm.

Said printing operation can be printed with a set of inks having multiple colors. It is noted that in the preferred embodiment the printing operation is performed with a set of printheads, wherein each printhead is preferably dedicated to print one respective ink. Said set of inks is of the type CMYK (cyan, magenta, yellow, black) or, preferably, CRYK (cyan, red, yellow, black). The inventor has found that using the substitution of magenta ink with red ink can lead to a reduced ink consumption for printing wood patterns. In this way solicitation on the printheads can be minimized thereby reducing the risk of printing defects.

The set can comprise at least four inks. In the preferred embodiment the set of inks can comprise more than four inks, for example five or six inks. For example, the set of inks can comprise a base set having the four inks mentioned above, for example CMYK or CRYK, with an additional ink or an additional set of ink. Said additional ink or additional set can enlarge the color gamut with respect to a set of ink using four inks. Therefore, in this way it may be possible to print an enlarged selection of decors, in particular wood décor, with the same set of inks but with an improved quality, reduced metamerism and reduced ink consumption compared to CMYK color system. Inventor has found that by using the additional inks, since for developing one color of the décor it is possible to use an enlarged number of printheads, it is possible to reduce the solicitation on each printhead. Preferably, said additional inks can comprise magenta, red, light magenta, light yellow, light red and/or light black. With the expression light it is meant the additional ink comprises a reduced quantity of pigment, for example quantity of pigment that is at least less than one half, more preferably less than one fifth, of the pigment quantity of the respective ink, for example the light black ink comprises a pigment quantity that is less than one half, more preferably less than one fifth of the pigment quantity of the black ink.

According to a preferred embodiment, said inks of the sets are printed on the substrate according to a predetermined sequence. For example, the printheads of the different color are aligned along a printing direction, for exampling an advancing direction of the printable substrate, so that one printhead of a predefined color prints first and the other color are subsequently printed. In the preferred embodiment, said sequence is selected in order to reduce the ink consumption for printing the décor, preferably wood decors. For example, said sequence can start with cyan or yellow, for example it can be CRYK or CMYK.

According to its second independent aspect the invention may relate to a method for printing onto a décor paper and/or foil, said décor paper or décor foil being suitable for being used in decorative panels, said method comprising the steps of providing a printable substrate and the step of printing a pattern on said printable substrate, wherein said pattern is printed by ejecting droplets of ink by means of at least one inkjet printing head, wherein said head comprises one or more nozzles, wherein during said step of printing a print quality control operation is performed wherein in that said print quality control operation is configured to identify at least one predetermined printing defect and/or to determine at least one printing quality parameter and to send a signal to a printer control unit on the basis of said identification, and in that said printer control unit is configured to interrupt the ejecting of the ink for a predetermined time period and/or change a control frequency of the printhead for a predetermined time period on the basis of said signal. For example, the printing defect and/or the printing quality parameter can be identified with optical sensors, for example a digital scanner. In this second independent aspect, the printing quality can be determined on the basis of one or more quality parameter determined in said evaluation step and/or one or more quality index that is function of said quality parameter. In this way it may be possible to stop the ink jetting operation or vary the control frequency only when the printing quality is considered insufficient. For example, said time period can start only when the quality index is higher or lower than a predetermined threshold value.

It is noted that the method according to the second independent aspect can comprise any of the features described above in relation to the first independent aspects.

For example, the feature of the ink, substrate and/or ink receiver layer can be the same of the first independent aspect.

According to its second independent aspect the invention may relate to method for printing onto a décor paper and/or foil, said décor paper or décor foil being suitable for being used in decorative panels, said method comprising the steps of providing a printable substrate and the step of printing at least two printed patterns, or at least two groups of printed patterns, on said printable substrate, wherein said patterns are printed by ejecting droplets of ink by means of at least one inkjet printing head, wherein during said printing operation a relative movement between the printable substrate and the printing head in a printing direction is performed, wherein the method comprises the step of printing a technical area between said two printed patterns or between said two groups of printed patterns, preferably wherein said technical area has a length in said printing direction that is lower than 10 mm By leaving said technical area it may be possible to relax the nozzles thereby restoring printing quality, possibly deteriorated during printing of one of said printed patterns or one of said groups of printed patterns.

In some embodiments, the technical area can be unprinted. In some other embodiments the technical area can comprise a technical pattern configured to emphasize possible printing defects and/or show printing quality.

It is noted that the method according to said second independent aspect can comprise one or more of the features of the first or second printing aspect. In particular, during forming of said technical area the ejecting of the nozzle can be interrupted and/or a control frequency of the nozzle can be changed, preferably reduced.

It is noted that the décor paper or décor foil obtained in the method of the first or second aspect can be used in a method for manufacturing a laminated panel that comprises the steps of: providing a substrate, attaching said décor paper or foil on top of the substrate. In case of décor paper the substrate can be a wood-based panel or a resin impregnated paper and the method comprises the step of impregnating the décor paper with a thermosetting resin, preferably melamine-based, and heat pressing the impregnated décor paper on top of the substrate, for example in a DPL or HPL process. In case of a décor foil, the substrate can be a thermoplastic material based panel and the foil can be attached on the substrate. In case the substrate is a pre-impregnated paper, the printed paper is lacquered and glued on a substrate

BRIEF DESCRIPTION OF THE DRAWINGS

With the intention of better showing the characteristics of the invention, in the following, as an example without any limitative character, several preferred forms of embodiments are described with reference to the accompanying drawings, wherein.

DESCRIPTION OF NON-LIMITING EMBODIMENTS

Figure 1:
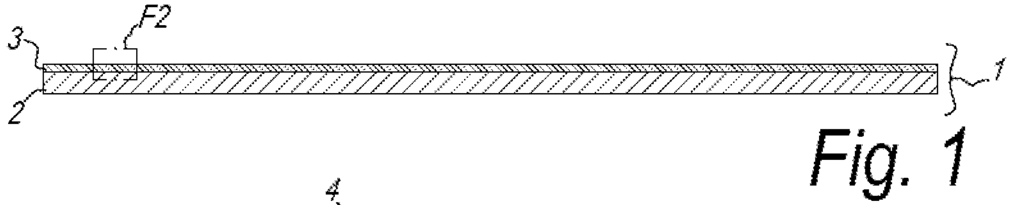
FIG. 1 shows a transversal section of a printable décor paper.

FIG. 1 schematically illustrates a printable substrate 1 that is printable with an inkjet printer. The printable paper layer 1 comprises a paper sheet 2 provided with an inkjet receiver coating 3. The paper sheet 2 is, in this case, a base printing paper having a weight of about 70 grams per square meter and with a mean air resistance as expressed by Gurley value of between 10 and 30 seconds. The paper sheet is suitable for being impregnated with a thermosetting resin so that it can be used in the manufacturing of laminate panel as it will be discussed below.

The printable substrate 1 comprises an amount of inkjet receiver coating 3 that is equal or lower than 5 g/m2 dry weight. This amount of inkjet receiver coating 3 has been found ideal to preserve the impregnation capacity of the paper 2.

It is generally noted that the dimensions of the represented paper sheet 2 and the inkjet receiver coating 3 is, in the figures, drawn out of scale in order to better illustrate the invention.

Figure 2:
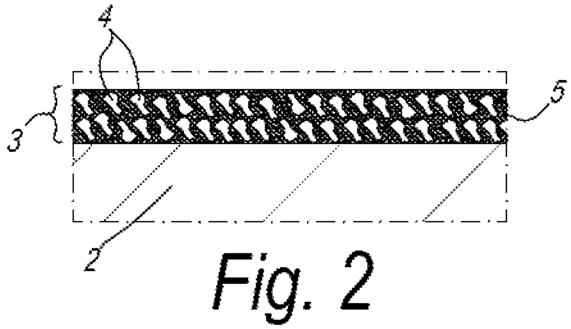
FIG. 2 shows an enlarged view of area F2 of FIG. 1.

FIG. 2 shows that the inkjet receiver coating 3 comprises pigments 4. In the preferred embodiment the pigment substantially consists of silica particles. The inkjet receiver coating 3, further comprises a binder 5 preferably polyvinyl alcohol, a crosslinker, an ink reactive compound, more particularly a flocculating agent and/or a dispersant, such in accordance with the first aspect of the invention. It is clear however that the figures are also illustrative for many aspects of the present invention in the cases where an ink reactive compound, more specifically an ink destabilizing agent, other than a flocculating agent has been applied, such as for example a cationic metal salt.

Figure 3:
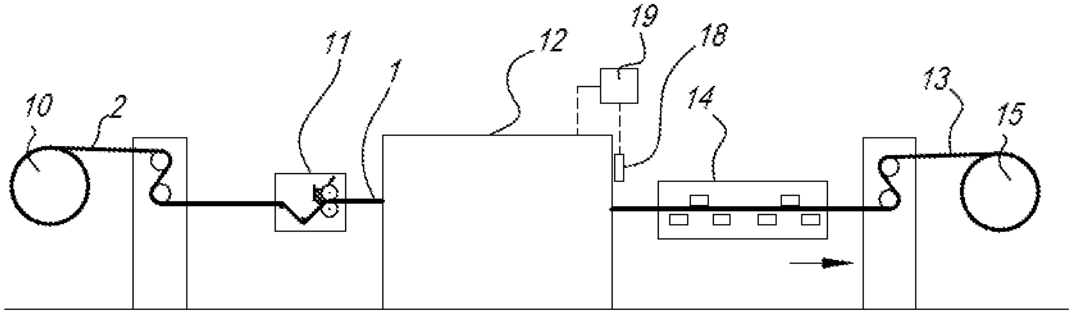
FIG. 3 shows some steps of a method for manufacturing a decorative paper according to the first independent aspect of the invention.

FIG. 3 illustrates some step in a method for manufacturing a décor paper in accordance with the first independent aspect of the invention. FIG. 3 illustrates that the paper sheet 2 may be uncoiled from a starting roller 10 and coated with the ink receiver coating 3 in a coating station 11, to obtain the printable substrate 1. The printable substrate 1 is then fed to an inkjet printer 12. The printer 12, in this example, relates to a printer of the single pass type. The inkjet printer 12 is commanded for printing a décor on the printable substrate 1 thereby forming a décor paper 13. The décor paper 13 is optionally dried in a drier 14 and the décor paper 13 that is subsequently coiled up in a second roller 15.

Figure 4:
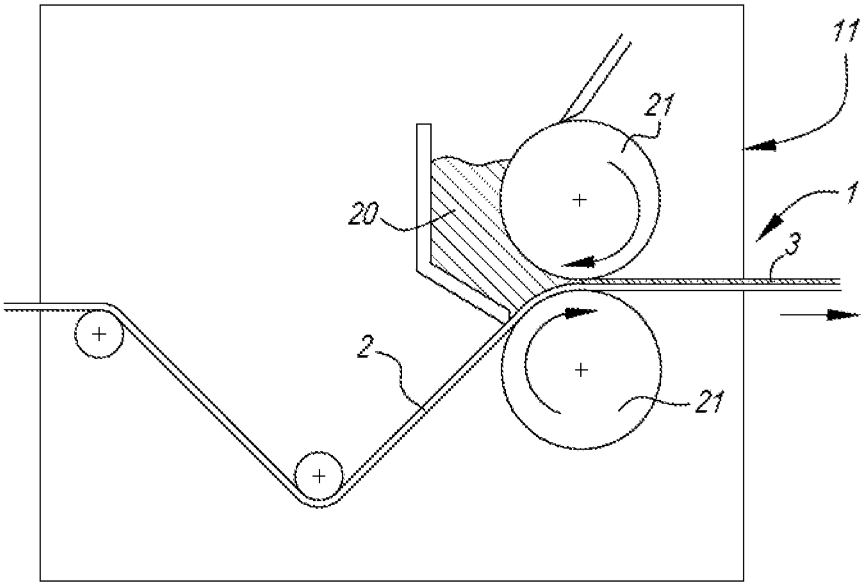
FIG. 4 shows a enlargement of a coating station of FIG. 3.

FIG. 4 shows that, in accordance with a preferred embodiment, the ink receiver coating 3, may be obtained by applying a liquid substance 20 on the upper surface of the paper layer 2. The coating station 11 comprises reverse metering rollers 21. Such coating station 11 may initially apply an excess of the liquid substance 20, which is squeezed off to the desired weight by means of the rollers 21, which also may provide for a smooth coating surface. Preferably, the obtained half product is then dried, e.g. by means of a hot air oven, to reach a residual humidity level of preferably below 10%, or of about 7%. Such is here not illustrated, but this may be executed in a fairly similar way. It is clear that as an alternative to the coating station 11, other application techniques may be used, such as application by one or more gravure rollers, possibly also running in reverse, or with a size press or a film press, preferably in line with the paper machine.

Figure 5:
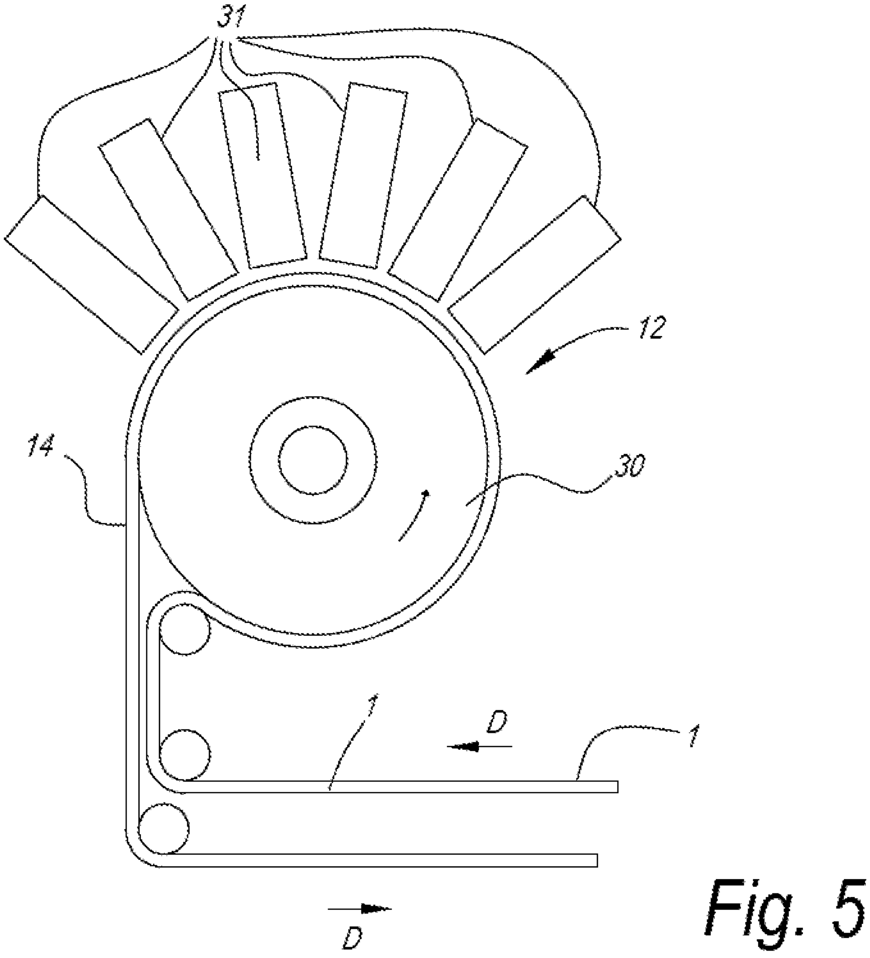
FIG. 5 shows a enlargement of a printer of FIG. 3.

FIG. 5 illustrates that, in this example, the inkjet printer 12 comprises a central cylinder 30 upon which the printable substrate 1 is partially wound and further comprises several printing units 31, each comprising one or more print heads, disposed radially around the central cylinder 30 and over the area of the printable substrate 1 to be printed. For example, the central cylinder 30 of the inkjet printer 12 comprises a radius between 800 and 950 mm, for example around 880 mm, and comprises a web angle above 270°, for example above 300°, preferably 320°. The printer 12, in this example, relates to a printer of the single pass type, wherein the provision of the printed pattern involves a relative motion of said inkjet printer 12, more particularly the printing unit 31, and said paper substrate 1 during printing in a printing direction D. In this case, the printing unit 31 and the print heads are at standstill, while the printable substrate 1 moves during ejection of inks. In this way, the printable substrate 1 gets printed during a single continuous movement of the printable substrate 1 relative the printer 12 or the rows of print heads.

As mentioned above, each printing unit 31 comprises a plurality of printheads and each printhead comprises a plurality of ejecting nozzle to eject the ink. Each nozzle can comprise a piezoelectric element that can be controlled through a controlling frequency for commanding the ejecting of the ink. Each printing unit 31 is dedicated to print one respective color. In the embodiment shown the printer is adapted to print with a set of inks having a minimum number of four colors, for example six colors. Preferably, said set of ink comprises cyan ink, magenta and/or red ink, yellow ink and black ink. Red ink is preferred above magenta ink for printing wood decors. In the example of the figures the set of inks further comprises a light red ink and a light black ink. Preferably said ink are printed according to a predefined sequence along the printing direction D that is configured to reduce the quantity of ink to be delivered on the printable substrate 1. As shown in FIG. 5, the preferred sequence starts with Cyan and ends with black or light black. Preferably the sequence is cyan (C), red (R), light red (1R), yellow (Y), black (K) and light black (1K).

Preferably the inks are water-based pigmented inks.

Figure 6:
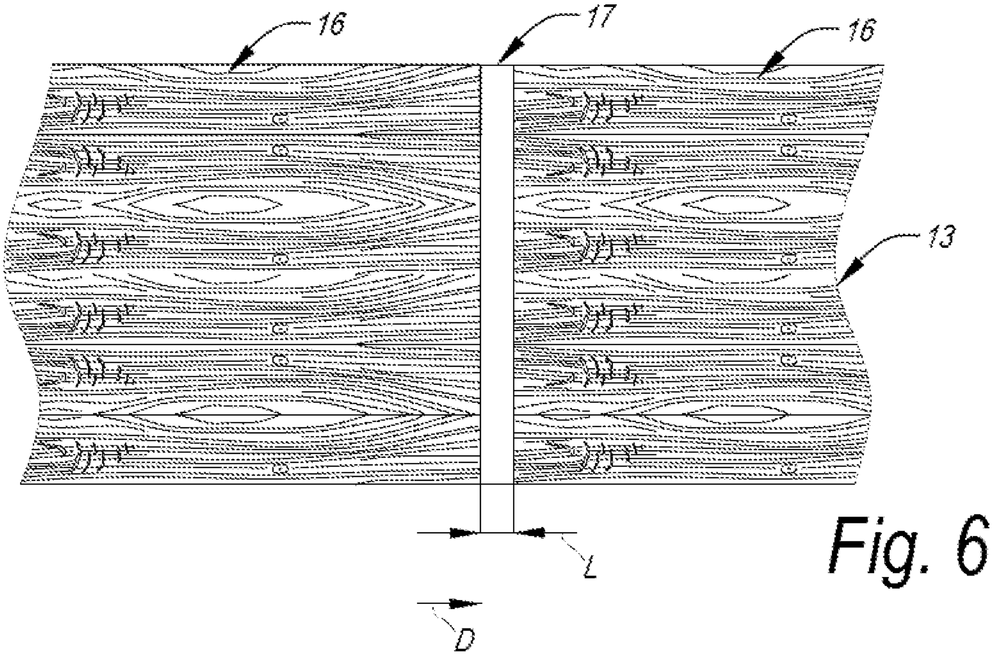
FIG. 6 shows a top view of a portion of a decorative paper obtained in the method of FIG. 3.

The printer 12 is configured to print one or more decorative patterns 16 (FIG. 6), preferably wood or stone décor, on the printable substrate 1 in a continuous manner for a first predetermined time period. This prolonged solicitation on the nozzle can cause the forming of residual vibrations in the nozzles leading to printing defects. According to the method of the first independent aspect of the invention, the printer is configured for interrupting the jetting of the ink for a second predetermined time period. In the embodiment shown in the figures, the jetting is interrupted in all the nozzles of all the printheads simultaneously so that a technical area 17 is formed on the printed paper 13, in the example an unprinted area. Said technical area has a length L, parallel to the printing direction, that is lower than 10 mm During said second predetermined period it is possible to relax the stress on the nozzles so to restore the printing quality. At the end of the second time period the jetting of the ink reprises for printing the decorative pattern 16 for another first time period.

As illustrated in FIG. 3, a visual camera 18 can be connected to the printer 12 and is configured to identify printing defects on the printed paper 13. Said visual camera 18, in the example, is connected to a control unit 19 connected to the printer 12. The control unit 19 can be configured to start the second time period on the basis on the identification of the printing defects.

Figure 7:
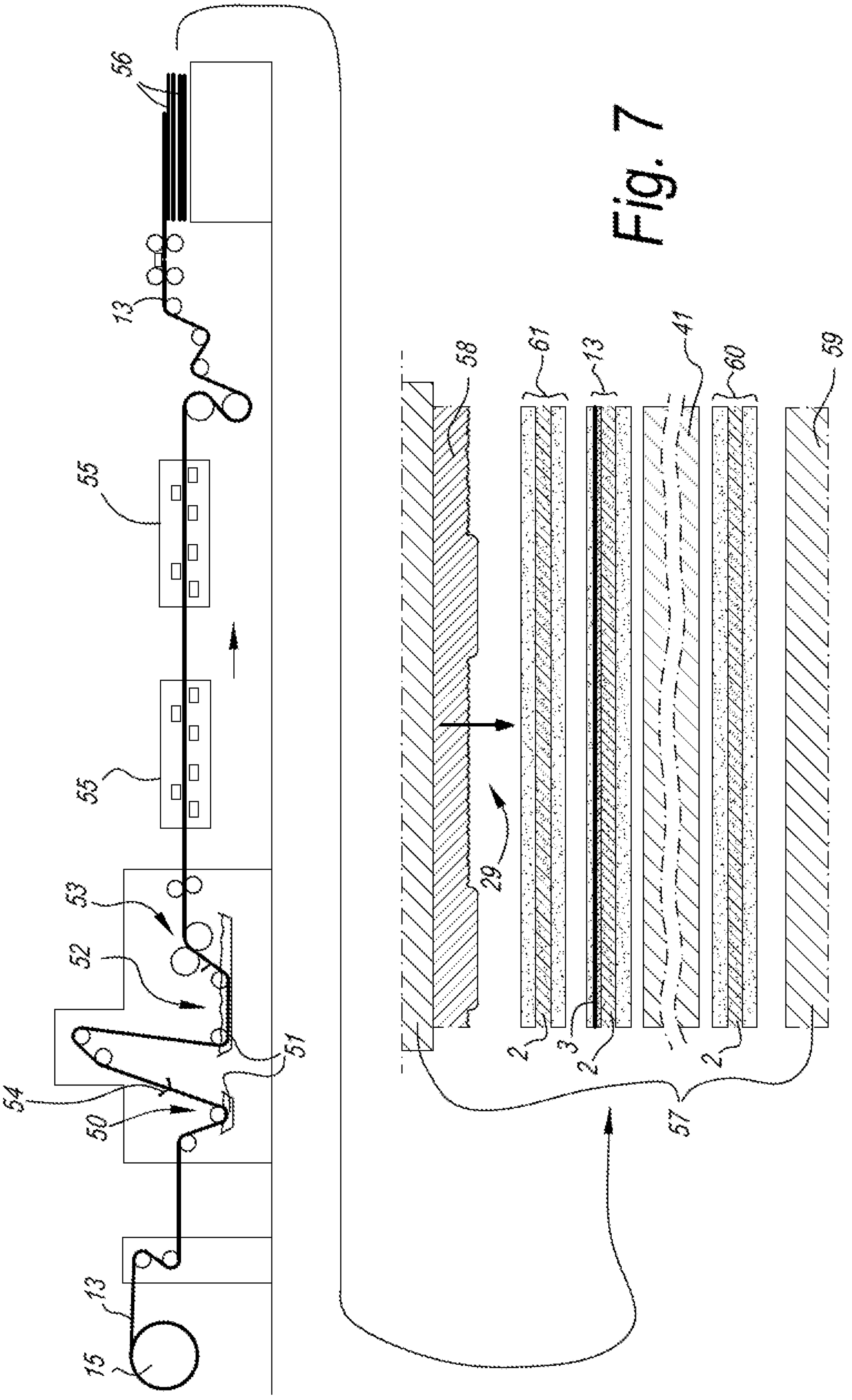
FIG. 7 shows some steps of a method for manufacturing a laminate panel comprising the decorative paper of FIG. 6.

FIG. 7 illustrates some steps of a method for manufacturing decorative panels 40 of the type shown in FIG. 7.

Figure 8:
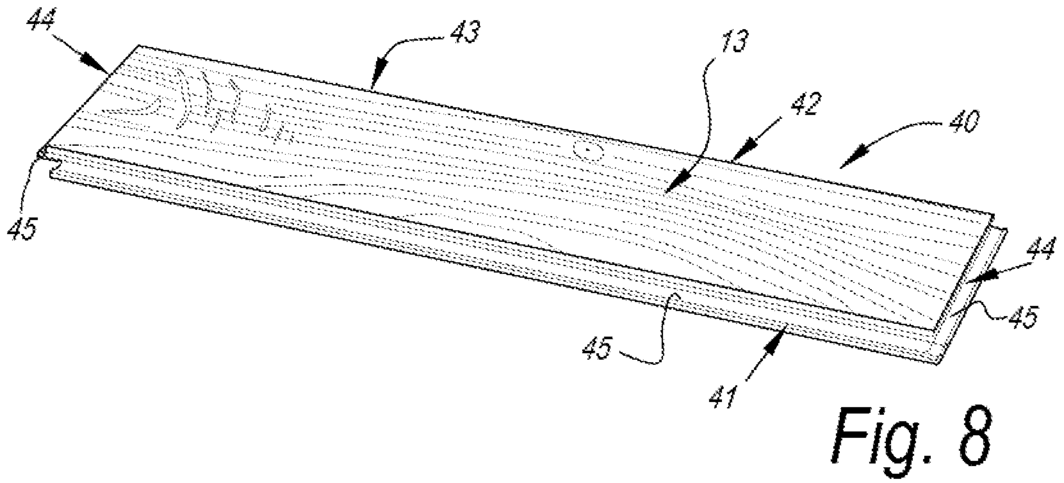
FIG. 8 shows a perspective view of a laminate panel obtainable through the method of FIG. 7.

The obtained decorative panels 40 at least comprise a substrate 41, preferably made of MDF or HDF, and a top layer 42. The top layer 42 comprises a décor paper 13 formed by the printable substrate 1 of FIG. 1 provided with a printed pattern 16 or a digitally printed ink layer representing a wood pattern, as is the case here. FIG. 8 illustrate that the obtained decorative panel or laminate panel 40 can have the shape of a rectangular and oblong laminate floor panel, with a pair of long sides 43 and a pair of short sides 44. In this case the panel 40 is provided at its edges 43, 44 with coupling means 45 allowing to lock the respective edges 43, 44 together with the sides of a similar panel.

In the method of FIG. 7 the décor paper 13 is taken from the second roll 15 and transported to an impregnation station 50, where said décor paper 13 is immersed in a bath 51 of a thermosetting resin, more particularly a mixture of water and thermosetting resin composition. Preferably, said thermosetting resin is a melamine-based resin, for example melamine formaldehyde or urea formaldehyde resin. The décor paper 13 is then allowed to rest while in this case being transported upwards. The resting allows for the resin to penetrate the paper sheet 2. The décor paper 13 then comes into a second impregnation station 52 where the paper layer 1 is, in this case, again immersed in a bath 51 of resin. A set of squeezing rollers 53 allows to dose the amount of resin applied to the décor paper 13.

In the example several doctor blades 54 are available for partially removing resin at the surface of the resin provided décor paper 13.

The resin provided décor paper 13 is dried and its residual humidity level is brought to below 10%. In the example hot air ovens 55 are used, but alternatively other heating equipment can be used, such as microwave or infrared drying equipment.

FIG. 7 also illustrates that the continuous resin provided décor paper 13 is cut to sheets 56 and stacked. In the example described the technical areas 17 of the décor paper can be cut away so that only the portions comprising the printed pattern 16 are used to form the sheets 56.

The obtained sheets 56 of the resin provided décor paper 13 are taken up from the stack to be pressed in a short daylight press 57 between upper and lower press plates 58-59. Said stack comprises from bottom to top a counter layer 60, a plate shaped substrate 41, the abovementioned sheet 56 of the resin provided décor paper 13 and a wear layer 61, wherein the counter layer 60 and the protective layer 61 both comprise a paper sheet, in case of the wear layer 61 called overlay paper, and resin. The stack is then pressed and the press treatment results in a mutual connection between the constituent layers 60-41-56-61 of the stack, as well as in a hardening or curing of the thermosetting resin. More particularly here a polycondensation reaction of the melamine-based resin takes place, having water as a by-product.

The upper press plate 58 is a structured press plates that provides a relief in the melamine surface of the panel 40 during the same press treatment by bringing the structured surface into contact with the melamine of the protective layer 61.

The present invention is in no way limited to the hereinabove described embodiments, but such may be realized according to different variants without leaving the scope of the present invention.

Further, as is clear from the content of the description, the present invention relates to one or more of the items as listed below, numbered from 1 to 38:

1.—A method for printing onto a décor paper and/or foil, said décor paper or décor foil being suitable for being used in decorative panels, said method comprising the steps of providing a printable substrate and the step of printing a pattern on said printable substrate, wherein said pattern is printed by ejecting droplets of ink by means of at least one inkjet printing head, wherein said head comprises one or more nozzles, wherein in that after a first predetermined time period the ejecting of the ink form the nozzles is interrupted for a second predetermined time period and/or a controlling frequency of the printhead is changed for a second predetermined time period.

2.—The method according to item 1, wherein said second predetermined period of time is shorter than the first period of time, preferably at least 10 time shorter, more preferably at least 100 time shorter.

3.—The method according to any of the preceding items, wherein said method is of a roll-to-roll type.

4.—The method according to any of the preceding items, wherein a relative movement between the printing substrate and the printing head is performed during the printing steps.

5.—The method according to item 4, wherein said relative movement is performed during the first predetermined time period and during said second predetermined time period.

6.—The method according to any of the preceding items, wherein said change of the control frequency involves a reduction of the control frequency.

7.—The method according to any of the preceding items, characterized in that it comprises the step of providing an ink receiver layer onto the printing substrate before the printing step is performed.

8.—The method according to item 7, wherein said ink receiver layer is not provided during said second predetermined time period.

9.—The method according to item 7, wherein said ink receiver layer is provided also during said second predetermined time period.

10.—The method according to any of the preceding items, wherein said printing step is performed using a set of inks, preferably wherein said set of inks is of the type CMYK or CRYK.

11.—The method according to any of the preceding items, wherein said set of inks comprises more than four inks, preferably six inks.

12.—The method according to item 11, wherein said set of ink comprises a light red and/or a light black ink.

13.—The method according to any of the items from 10 to 12, wherein said inks are printed onto the printing substrate according to a predetermined sequence, preferably said sequence is configured to reduce the amount of ink to be printed on the printing substrate.

14.—The method according to item 13, wherein said sequence is CRYK or CMYK.

15.—The method according to any of the preceding items, wherein during said second predetermined time period a technical area is formed on said printable substrate 16.—The method according to item 15, wherein said technical area has a length along a printing direction, that is lower than 10 mm.

17.—The method according to any of the preceding items, wherein in said technical area is an unprinted area.

18.—The method according to any of the preceding items, wherein in said technical area a technical pattern is printed, preferably said technical pattern is configured to highlight printing defects.

19.—The method according to any of the preceding items, wherein said second predetermined period starts only after completion of printing of a discrete number of printed patterns.

20.—A method for printing onto a décor paper and/or foil, said décor paper or décor foil being suitable for being used in decorative panels, said method comprising the steps of providing a printable substrate and the step printing a pattern on said printable substrate, wherein said pattern is printed by ejecting droplets of ink by means of at least one inkjet printing head, wherein said head comprises one or more nozzles, wherein during said step of printing a print quality control operation is performed characterized in that said print quality control operation is configured to identify at least one predetermined printing defect and to send a signal to a printer control unit on the basis of said identification, and in that said printer control unit is configured to interrupt the ejecting of the ink for a predetermined time period and/or change a control frequency of the printhead for a predetermined time period.

21.—The method according to item 20, wherein said second predetermined period of time is shorter than the first period of time, preferably at least 10 time shorter, more preferably at least 100 time shorter.

22.—The method according to item 20 or 21, wherein said method is of a roll-to-roll type.

23.—The method according to any of items from 20 to 22, wherein a relative movement between the printing substrate and the printing head is performed during the printing steps.

24.—The method according to item 23, wherein said relative movement is performed during the first predetermined time period and during said second predetermined time period.

25.—The method according to any of items from 20 to 24, wherein said change of the control frequency involves a reduction of the control frequency.

26.—The method according to any of items from 20 to 25, characterized in that it comprises the step of providing an ink receiver layer onto the printing substrate before the printing step is performed.

27.—The method according to item 26, wherein said ink receiver layer is not provided during said second predetermined time period.

28.—The method according to item 27, wherein said ink receiver layer is provided also during said second predetermined time period.

29.—The method according to any of items from 20 to 28, wherein said printing step is performed using a set of inks, preferably wherein said set of inks is of the type CMYK or CRYK.

30.—The method according to any of items from 20 to 29, wherein said set of inks comprises more than four inks, preferably six inks.

31.—The method according to item 30, wherein said set of ink comprises a light red and/or a light black ink.

32.—The method according to any of the items from 20 to 31, wherein said inks are printed onto the printing substrate according to a predetermined sequence, preferably said sequence is configured to reduce the amount of ink to be printed on the printing substrate.

33.—The method according to item 32, wherein said sequence is CRYK or CMYK

34.—The method according to any of items from 20 to 33, wherein said second predetermined period starts only after completion of printing of a discrete number of printed patterns 35.—A method for printing onto a décor paper and/or foil, said décor paper or décor foil being suitable for being used in decorative panels, said method comprising the steps of providing a printable substrate and the step of printing at least two printed patterns, or at least two groups of printed patterns, on said printable substrate, wherein said patterns are printed by ejecting droplets of ink by means of at least one inkjet printing head, wherein during said printing operation a relative movement between the printable substrate and the printing head in a printing direction is performed, wherein the method comprises the step of printing a technical area between said two printed patterns or between said two groups of printed patterns, preferably wherein said technical area has a length in said printing direction that is lower than 10 mm.

36.—The method according to item 35, wherein said technical area is an unprinted area.

37.—The method according to item 35 or 36, wherein said technical area comprises a technical printed pattern configure to highlight printing performances and/or possible printing defects.

38.—The method according to item 35 or 37, wherein during forming of said technical area ejecting of the ink form the nozzles is interrupted and/or a controlling frequency of the printhead is changed, preferably reduced.

The invention claimed is:

1. A method for printing onto a décor paper and/or a décor foil, the décor paper or the décor foil being suitable for being used in decorative panels, the method comprising:

providing a printable substrate;

printing a pattern on the printable substrate;

wherein the pattern is printed by ejecting droplets of ink using at least one inkjet print head;

wherein the inkjet print head includes one or more nozzles;

wherein after a first predetermined time period the ejecting of the ink form the nozzles is interrupted for a second predetermined time period and/or a controlling frequency of the inkjet print head is changed for a second predetermined time period;

providing an ink receiver layer onto the printable substrate before the printing is performed; and wherein the ink receiver layer is not provided during the second predetermined time period.

2. The method according to claim 1, wherein the second predetermined period of time is shorter than the first predetermined time period.

3. The method according to claim 1, wherein the method is of a roll-to-roll type.

4. The method according to claim 1, wherein a relative movement between the printable substrate and the inkjet print head is performed during the printing.

5. The method according to claim 4, wherein the relative movement is performed during the first predetermined time period and during the second predetermined time period.

6. The method according to claim 1, wherein the change of the control frequency involves a reduction of the control frequency.

7. The method according to claim 1, wherein the printing is performed using a set of inks; and wherein the set of inks is of the type CMYK or CRYK.

8. The method according to claim 7, wherein the inks are printed onto the printable substrate according to a predetermined sequence that is configured to reduce the amount of ink to be printed on the printable substrate.

9. The method according to claim 8, wherein said the predetermined sequence is CRYK or CMYK.

10. The method according to claim 1, wherein the printing is performed using a set of inks; and wherein the set of inks comprises more than four inks.

11. The method according to claim 10, wherein the set of ink comprises a light red and/or a light black ink.

12. The method according to claim 1, wherein during the second predetermined time period a technical area is formed on the printable substrate.

13. The method according to claim 12, wherein the technical area has a length along a printing direction, that is less than 10 mm.

14. The method according to claim 12, wherein in the technical area is an unprinted area.

15. The method according to claim 12, wherein in the technical area a technical pattern is printed; and wherein the technical pattern is configured to highlight printing defects.

16. The method according to claim 1, wherein the second predetermined time period starts only after completion of printing of a discrete number of printed patterns.

17. A method for printing onto a décor paper and/or a décor foil, the décor paper or the décor foil being suitable for being used in decorative panels, the method comprising:

providing a printable substrate; and printing a pattern on the printable substrate;

wherein the pattern is printed by ejecting droplets of ink using at least one inkjet print head;

wherein the inkjet print head includes one or more nozzles;

wherein during printing a print quality control operation is performed;

wherein the print quality control operation is configured to identify at least one predetermined printing defect and to send a signal to a printer control unit on the basis of the identification;

wherein the printer control unit is configured to interrupt the ejecting of the ink for a predetermined time period and/or change a control frequency of the inkjet print head for a predetermined time period;

providing an ink receiver layer onto the printable substrate before the printing is performed; and wherein the ink receiver layer is not provided during the predetermined time period.

* * * * *